United States Patent
Nemeskeri et al.

(10) Patent No.: US 6,918,753 B2
(45) Date of Patent: Jul. 19, 2005

(54) DUAL-MOLD THERMOFORMING PRESS

(75) Inventors: Georg Nemeskeri, Chester (CA); Brent Fay, Chester (CA); Rodney Publicover, Boutilier's Point (CA); Stephen Fitzgerald, Halifax (CA); Colin Veinot, Bridgewater (CA); Gary Holmes, Lake Echo (CA); David Rhodes, Chester Basin (CA); Denis Savoie, Kentville (CA); Randy Steadman, Mahone Bay (CA); Peter Haase, Bridgewater (CA)

(73) Assignee: G.N. Plastics Company Ltd., Chester (CA)

( * ) Notice: Subject to any disclaimer, the term of this patent is extended or adjusted under 35 U.S.C. 154(b) by 330 days.

(21) Appl. No.: 10/278,782

(22) Filed: Oct. 24, 2002

(65) Prior Publication Data

US 2003/0090041 A1 May 15, 2003

(30) Foreign Application Priority Data

Nov. 15, 2001 (CA) ............................................. 2363309

(51) Int. Cl.⁷ ............................................. B29C 51/20
(52) U.S. Cl. ....................... 425/183; 425/409; 425/504; 425/451
(58) Field of Search ................................. 425/183, 409, 425/503–504, 450.1–451, 383–402

(56) References Cited

U.S. PATENT DOCUMENTS

| | | | | |
|---|---|---|---|---|
| 3,591,896 A | * | 7/1971 | Tartaglia | 425/384 |
| 3,743,466 A | * | 7/1973 | Gampe | 425/451 |
| 3,830,613 A | | 8/1974 | Aoki | 425/246 |
| 4,079,104 A | | 3/1978 | Dickson et al. | |
| 4,105,736 A | | 8/1978 | Padovani | 264/153 |
| 4,132,319 A | | 1/1979 | Padovani | 214/1 BB |
| 4,519,762 A | * | 5/1985 | Ishihara et al. | 425/183 |
| 4,565,513 A | | 1/1986 | Kiefer | |
| 4,694,951 A | | 9/1987 | Gibbemeyer | |
| 4,818,212 A | | 4/1989 | Gibbemeyer | |
| 4,872,826 A | | 10/1989 | Padovani | 425/388 |
| 5,284,608 A | | 2/1994 | Vismara | 264/37 |
| 5,304,050 A | | 4/1994 | Vismara | 425/4 R |
| 5,453,237 A | | 9/1995 | Padovani | 264/153 |
| 5,591,463 A | | 1/1997 | Padovani | 425/359 |
| 5,650,110 A | | 7/1997 | Padovani | 264/153 |
| 6,042,360 A | | 3/2000 | Padovani | 425/403.1 |
| 6,287,507 B1 | | 9/2001 | Appel et al. | |
| 6,336,805 B1 | | 1/2002 | Padovani | 425/403.1 |

FOREIGN PATENT DOCUMENTS

| | | |
|---|---|---|
| DE | G9108344.3 | 10/1991 |
| GB | 1462204 | 1/1977 |
| JP | 05269828 | 10/1993 |

* cited by examiner

*Primary Examiner*—Benjamin L. Utech
*Assistant Examiner*—Thu Khanh T. Nguyen
(74) *Attorney, Agent, or Firm*—Mario Theriault

(57) ABSTRACT

The thermoforming press has a frame, a forming die assembly affixed to the frame, a mold-supporting table suspended to the frame under the forming die assembly, and a pair of molds mounted side by side on the mold-supporting table. A drive system is provided for imparting a pendulum movement to the mold-supporting table for alternately registering one of the molds with the forming die assembly while the other mold is positioned at a part retrieving station. The part retrieving and stacking mechanism has horizontal and angular displacements only as the vertical component of the retrieving motion is provided by the pendulum system. Spring discs are mounted between the forming die assembly and the press platen to control the forces generated between the forming die assembly and each mold.

20 Claims, 17 Drawing Sheets

DUAL-MOLD THERMOFORMING PRESS

FIELD OF THE INVENTION

This invention pertains to thermoforming machines having two molds alternately moving under a forming die assembly.

BACKGROUND OF THE INVENTION

In order to increase the production of a thermoforming machine, it has been a common practice in the plastic industry to use two molds mounted side by side and to alternately move these molds under a forming die assembly and then under a part-retrieving station. The parts formed in the first mold are retrieved from this mold while other parts are being formed in the other mold, and vice versa. These machines are characterized by the similarity of their mold-supporting tables mounted on rails and linear bearings for horizontal movement of the molds from side to side.

Examples of dual-mold thermoforming machines of the prior art are described in the following US patents.

U.S. Pat. No. 4,105,736 issued Aug. 8, 1978 to Pietro Padovani;

U.S. Pat. No. 5,304,050 issued Apr. 19, 1994 to Mario Vismara; and

U.S. Pat. No. 5,453,237 issued Sep. 26, 1995 to Pietro Padovani.

The mating of a mold with a forming and cutting die during a thermoforming process must be done with great precision to ensure an uniform wall thickness of the molded parts and a proper severing of the molded parts from a plastic sheet. Such precision requires that the molds and the mold-supporting tables be inflexible. The magnitude of the forces generated during the forming and cutting phases also requires that the molds and the mold-supporting tables have robust structures. As it is known, machine stiffness and strength are often associated with high mass, and high mass hinders acceleration, deceleration and cycle speed.

The thermoforming machines of the prior art are known to consume great amounts of energy to accelerate their mold-supporting tables from one molding position, and to dissipate equally large amounts of energy to decelerate the tables at the other molding position. Because of this energy constraint, basically, the cycle speed of the dual-mold thermoforming machines of the prior art has been limited by the capacity of these machines to move heavy molds quickly and precisely.

Therefore, it is believed that a need still exists in the industry for a better dual-mold thermoforming press which is less affected by the inertia of its molds and mold-supporting table.

SUMMARY OF THE INVENTION

In the dual-mold thermoforming press of the present invention, the mold-supporting table is suspended on arms and moves as a pendulum from one position to the other. The kinetic energy of the mold-supporting table during its acceleration from one position to the other is largely provided by the forces of gravity, and the deceleration of the table at the next molding position is also largely provided by the forces of gravity. Gravity forces are converted into potential energy at the two molding positions whereby the motion energy of the system is substantially conserved.

In accordance with one feature of the present invention, there is provided a thermoforming press for manufacturing molded parts, comprising a frame, a forming die assembly affixed to the frame, a mold-supporting table suspended to the frame under the forming die assembly, and a pair of molds mounted side by side on the mold-supporting table. The thermoforming press also has a drive system for imparting a pendulum movement to the mold-supporting table for alternately registering each of the molds with the forming die assembly.

The most important advantage of this pendulum arrangement is that the weight of the mold-forming table does not affect the cycle speed of the machine other than by changing its natural frequency. The potential energy of the mold-supporting table at one molding position is converted into kinetic energy when the table is allowed to move from that position to the next. The momentum of the mold-supporting table is converted back into potential energy as the table approaches the next molding position. When this pendulum system is operated at its natural frequency, the outside energy required is only that amount required to overcome friction, basically.

In accordance with another feature of the thermoforming press of the present invention, there is provided a toggle arm system mounted to the frame under the mold-supporting table. This toggle arm system has arms and rollers on these arms. The rollers are in contact with the mold-supporting table. The toggle arm system is operable for driving the pendulum system from rest and for counteracting the pressing forces during the molding and cutting phases of the thermoforming cycle.

In accordance with yet another feature of the thermoforming press, the mold-supporting table has rails along its underside. The rails comprise upper rails having downward-facing surfaces and lower rails having upward-facing surfaces. The rollers comprise support rollers guided against the downward-facing surfaces and captive rollers guided against the upper-facing surfaces. The toggle arm system is advantageous for imparting an upward force pulse during each ascending segment of the pendulum cycle and a downward force pulse during the descending segment, to increase the speed of the pendulum system beyond that available under natural frequency conditions.

In yet another aspect of the present invention, there is provided a thermoforming press for manufacturing molded parts. The press has a frame; a forming die assembly affixed to the frame; a mold-supporting table movably affixed to the frame under the forming die assembly; at least one mold mounted on the mold-supporting table, and a drive system for moving the mold-supporting table relative to the forming die assembly and for registering the mold with the forming die assembly. This thermoforming press also has springs mounted between the forming die assembly and the frame for allowing relative movement between the forming die assembly and the frame when the mold is engaging with the forming die assembly. These springs are advantageous for controlling a gradient of force being applied to the molded parts during the forming and cutting phases of a thermoforming process.

Other advantages and novel features of the present invention will become apparent from the following detailed description of the preferred embodiment.

In the present specification, the expression "forming die assembly" designates a pressure box, movable male plugs and cutting dies. The expression "forming position" of the thermoforming press designates the engagement of one of the molds with any part of the forming die assembly. The expression "cutting position" designates the engagement of one of the molds with the cutting dies, and the expression "molding position" designates either one of the forming and cutting positions.

BRIEF DESCRIPTION OF THE DRAWINGS

One embodiment of the present invention is illustrated in the accompanying drawings, in which like numerals denote like parts throughout the several views. For clarity, some of these numerals have not been reprinted on all the views. In the drawings.

DETAILED DESCRIPTION OF THE PREFERRED EMBODIMENT

Figure 1:
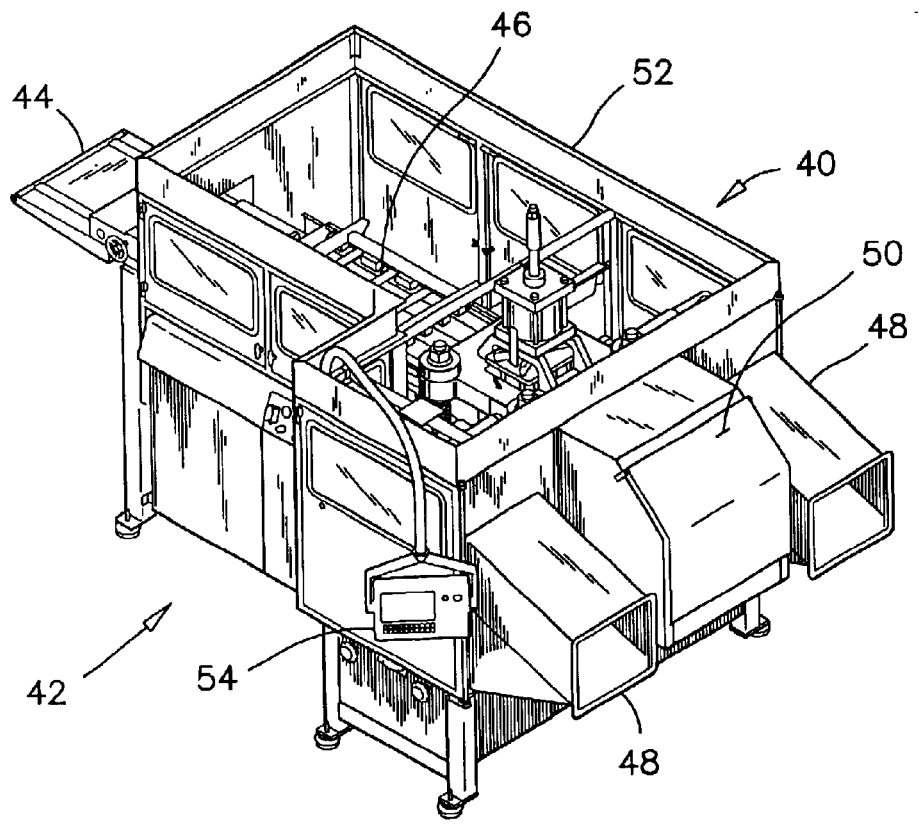
FIG. 1 is a perspective view of a thermoforming machine in which is incorporated the dual-mold thermoforming press according to the preferred embodiment of the present invention.
Figure 2:
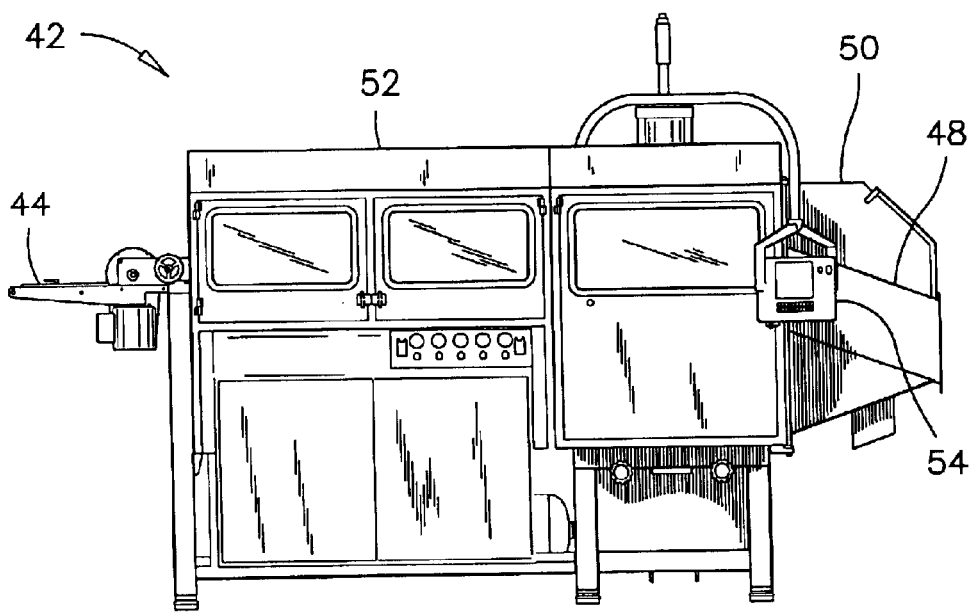
FIG. 2 is a side elevation view of the thermoforming machine shown in FIG. 1.

While this invention is susceptible of embodiments in many different forms, there is shown in the drawings and will be described in details herein one specific embodiment of a dual-mold thermoforming press, with the understanding that the present disclosure is to be considered as an example of the principles of the invention and is not intended to limit the invention to the embodiment illustrated and described.

Referring firstly to FIGS. 1–4, the dual-mold thermoforming press 40 is mounted in a thermoforming machine 42 which preferably has a plastic sheet feeder 44; a plastic sheet heating module 46; a pair of product stacking chutes 48 and a web extractor module 50. The thermoforming machine 42 also comprises a protective and decorative cabinet 52 and is controllable from an instrument panel 54.

Figure 3:
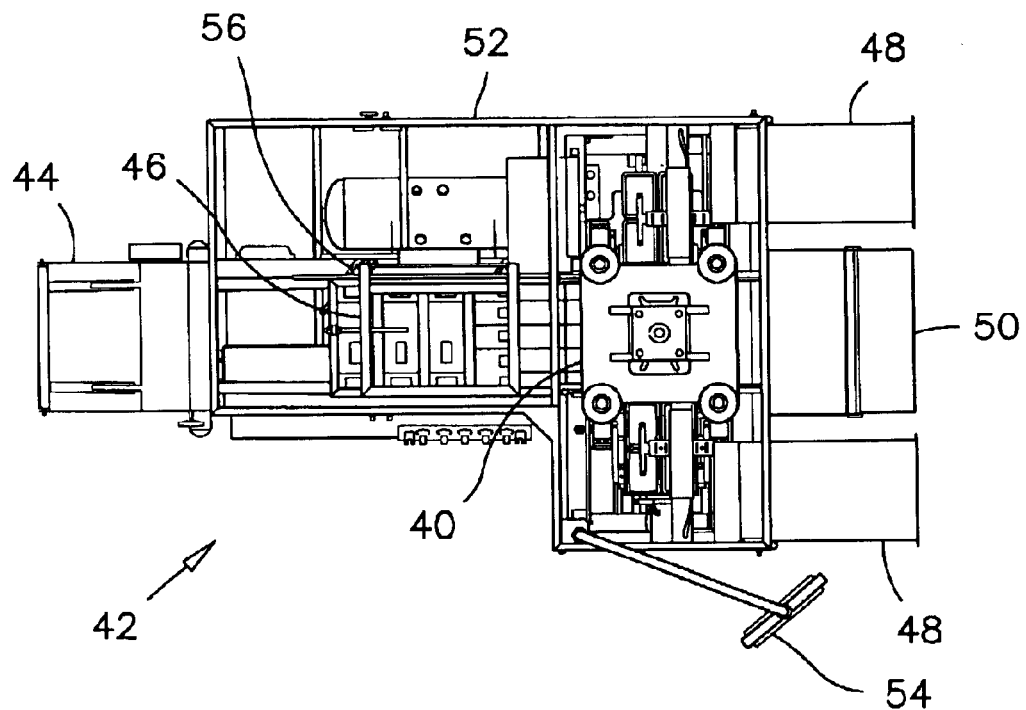
FIG. 3 is a plan view of the thermoforming machine showing the heater module thereof in an operating position.
Figure 4:
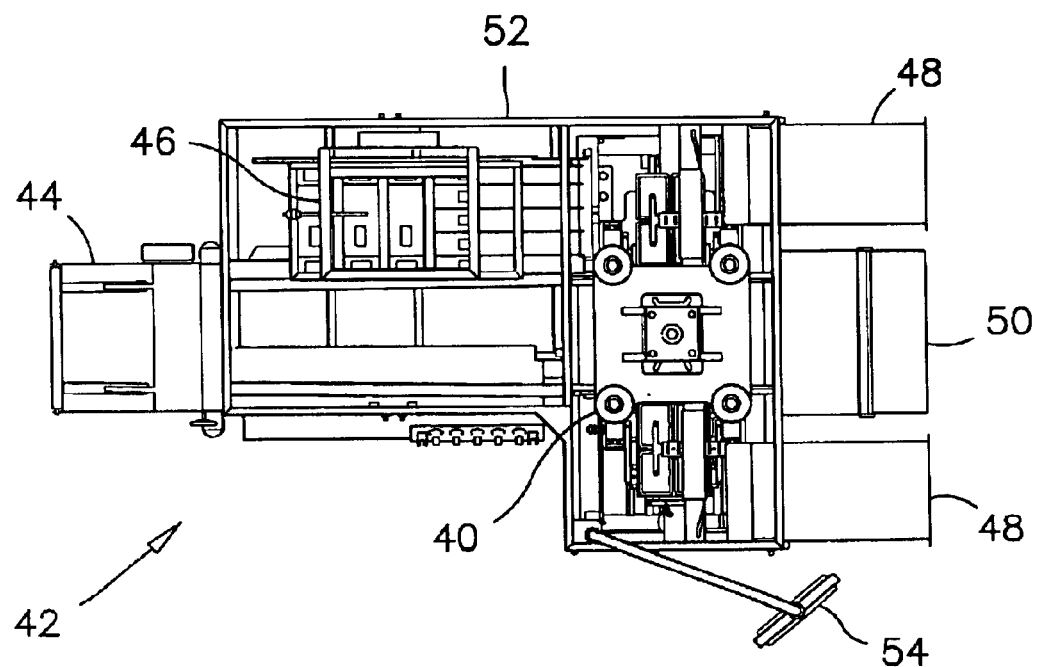
FIG. 4 is another plan view of the thermoforming machine showing the heater module thereof in a retracted, idle position.

The plastic sheet heating module 46 is movable between an operating position, in line with the sheet feeder 44, and an idle position aside from the axis of the sheet feeder 44, as illustrated in FIGS. 3 and 4 respectively. The plastic sheet heating module 46 is movable from one position to the other on parallel arms 56 which are only partly illustrated in FIG. 3. These arms are only partly illustrated because they do not constitute the focus of the present invention.

Numerous other components of the thermoforming machine and of the thermoforming press according to the preferred embodiment are not illustrated herein because these components belong to known technology and do not constitute the focus of the present invention.

Figure 5:
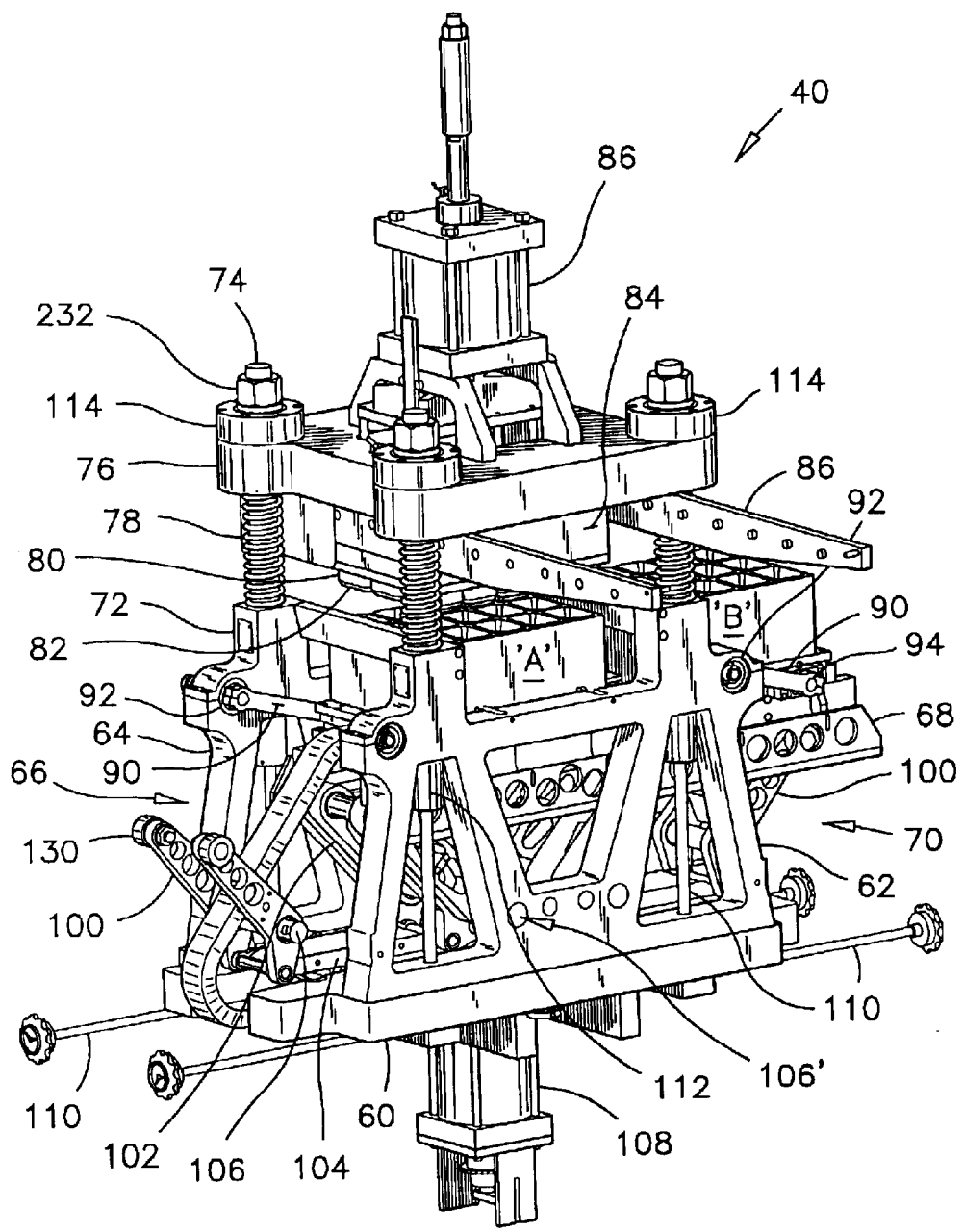
FIG. 5 is a partial perspective front, end and top view of the dual-mold thermoforming press according to the preferred embodiment of the present invention.

Referring to FIG. 5, the dual-mold thermoforming press according to the preferred embodiment of the present invention is illustrated in isolation therein, to show the various components thereof and to facilitate the description of their functions. Some parts have been omitted from the illustration for clarity. In particular, the bearing assemblies supporting the toggle arm system have not been shown in order to illustrate the linkages and pivot axes there behind.

Firstly, the thermoforming press 40 comprises a horizontal base 60 from which extend a front and rear side frame members labelled as 62, 64 respectively. The base and the front and rear frame members define an open space 66 in which is mounted a mold-supporting table 68 and a toggle arm system 70. The mold-supporting table 68 carries two female molds labelled as mold 'A' and mold 'B'.

Upon the upper end of the frame members 62, 64, there is provided a pair of bored holes 72 through which are mounted four vertical press rods 74. The press platen 76 is mounted on the press rods 74 and is held vertically at a distance above the bored holes 72 by springs 78.

The press platen 76 carries a forming die assembly comprising male pre-stretch plugs 80 and having cutting dies 82 mounted on its underside. The forming die assembly also comprises a pressure box 84 in which are mounted the male pre-stretch plugs 80. The pressure box 84 is held fix to the press platen 76. The pre-stretch plugs 80 are movable up and down inside the pressure box 84 by means of a first actuator 86 affixed to the press platen. The pre-stretch plugs 80 and the cutting dies 82 are only partly illustrated for being known to those skilled in the art. The label 80' designates generally any or all the components included in the forming die assembly.

A forming die insertion and removal track 88 is also mounted to the press platen. The structure of this track 88 is also well known by those skilled in the art and does not need further explanation.

Referring back to one of the novel features of the thermoforming press 40, the mold-supporting table 68 is suspended as a pendulum on four link bars 90. The link bars 90 are held into bearing assemblies in the frame members 62, 64, and along the sides of the mold-supporting table 68. These upper and lower bearing assemblies are labelled as 92 and 94 respectively. The length of the link bars 90 and the spacing of the molds 'A' and 'B' are selected such to the mold-supporting table 68 can be moved to alternately register mold 'A' and then mold 'B' with the forming die assembly 80', upon a movement of the table along an angle of about 180°, that is from one swing limit to the other. The movement of the mold-supporting table 68 will be further explained later when making reference to FIGS. 6–15.

The toggle arm system 70 has rollers operating against the underside of the mold-supporting table 68. The toggle arm system 70 is capable of following the table 68 up and down in harmony with the angular position of the link bars 90.

The toggle arm system 70 comprises a pair of symmetrical arm groups. Each arm group comprises an outside arm set 100 and an inside arm set 102. The arm sets in each group are connected to each other by connecting rods 104, and are actuated angularly about parallel axes 106, 106' by a second actuator 108 mounted under the base 60. Both arm groups are actuated back and forth in a same sector of a circle and in opposite directions relative to each other such as when opening and closing a fan.

As to another detail illustrated in FIG. 5, the position and alignment of the press platen 76 relative to the base 60 is adjustable by means of control handle and shaft assemblies 110 acting on the threaded adjustment nuts 112 to vary the position of the press rods 74 along the bored holes 72.

In yet another detail illustrated in FIG. 5, the pressing forces of the mold 'A' or 'B' against the press platen 76 is partly absorbed by spring blocks 114 mounted between the press platen 76 and the upper ends of the press rods 74. The features of these spring blocks 114 will be explained in details when making reference to FIGS. 24 and 25.

Figure 6:
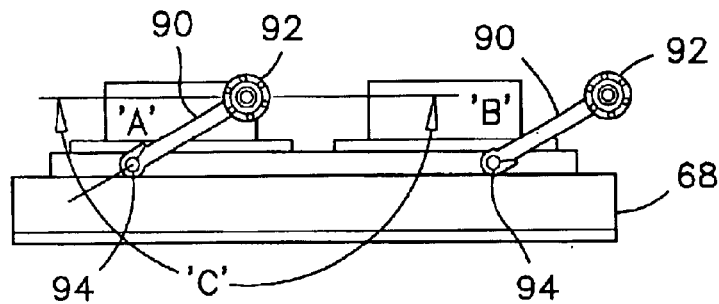
FIG. 6 is a partial front view of the mold-supporting table incorporated in the preferred dual-mold thermoforming press.
Figure 7:
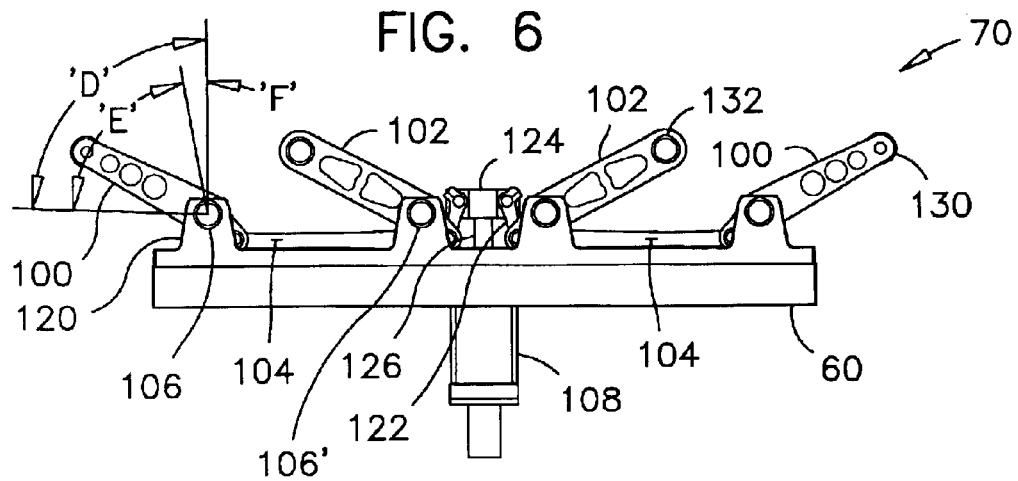
FIG. 7 is a partial front view of the toggle arm system in the preferred dual-mold thermoforming press.

Reference is now made to FIGS. 6 and 7. The mold-supporting table 68 is suspended on the link bars 90 and is movable as a pendulum along an angle 'C' of about 180°. The arm sets 100, 102 in the toggle arm system 70 are pivoted into bearings blocks 120 on the base 60 of the thermoforming press and are movable over an angle 'D' of about 90°. The arm sets 100, 102 are driven by link members 122 connected to the lower ends of the inside arm sets 102 and to a head block 124 mounted on the end of the piston rod 126 of the second actuator 108. As it was mentioned before, the outside arm sets 100 are connected in tandem with the inside arm sets 102 by connecting rods 104 such that all arm sets move in unison.

The outside arm sets 102 have outside rollers 130 in the form of cam follower bearings upon their extremities. The inside arm sets 102 have inside rollers 132 in the form of roller bearings mounted upon their ends. These rollers 130, 132 are held in contact with the rails under the mold-supporting table 68 as it will be explained later.

The second actuator 108 is a two-stage air cylinder. More details about this cylinder will be provided when making reference to FIGS. 17 and 19. The stroke lengths of the actuator 108 are determined such as to divide the angular movement 'D' of the arm sets 100, 102 into a forming stroke 'E' and a cutting stroke 'F'. The angular displacement 'E' for the forming stroke is about 80°, and the angular displacement 'F' for the cutting stroke is about 10°.

Having explained the functions of the major components of the thermoforming press according to the preferred embodiment, reference is now made to FIGS. 5–7 simultaneously to briefly explain the operation of this thermoforming press 40.

One-half of a thermoforming cycle consists of the following steps; the other half being symmetrical:

A) initiating the forming stroke 'E' and causing the toggle arm system 70 to follow the upward displacement of the mold-supporting table 68 along its pendulum movement;
B) registering one of the molds 'A' or 'B' with the cutting dies 82;
C) operating the first actuator 86 to push the pre-stretch plugs 80 down out of the pressure box 84 and into the cavities of the mold, to form with the aid of compressed air or vacuum a plastic sheet into the cavities of that mold;
D) while registering the mold with the cutting dies 82, counteracting the forming forces with the toggle arm system 70;
E) as a continuation of the pendulum movement, causing the mold to contact the cutting dies 82 and causing the cutting dies to penetrate the web;
F) as a continuation of the forming stroke 'E' mentioned before, causing the cutting stroke 'F' on the toggle arm system 70 to counteract the cutting forces applied between the mold and the cutting dies 82;
G) while forming parts in the first-mentioned mold, removing molded parts from the other mold; and
H) reversing the movement of the toggle arm system 70 to follow the downward movement of the mold-supporting table.

Figure 8:
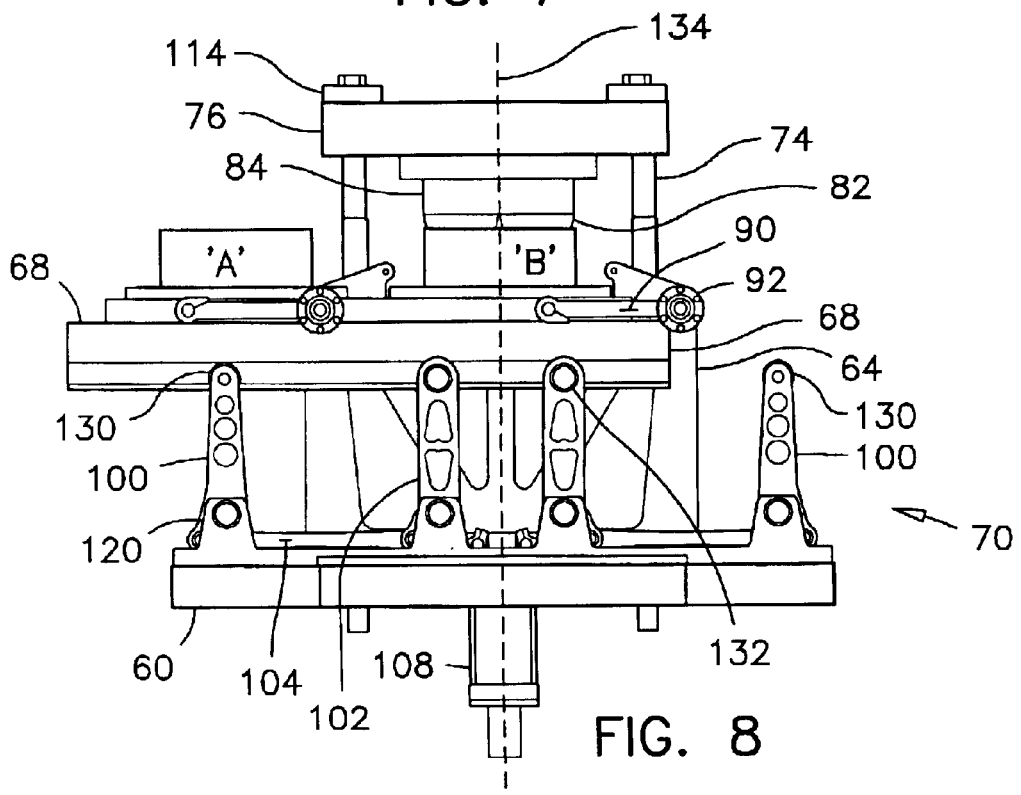
FIG. 8 is a partial front view of the thermoforming press with the mold-supporting table in a first molding position.

Reference is now made to FIGS. 8–15 to explain in greater details the operation of the thermoforming press 40. Firstly, FIG. 8 illustrates the thermoforming press with the toggle arm system 70 in a cutting position as applied to the mold 'B', where the mold-supporting table 68 is in a first uppermost position, with the mold 'B' engaged with the cutting dies 82. After the parts are formed in this mold, they are cut cleanly from the web by the cutting dies 82. During the cutting phase, the arms 100, 102 are aligned vertically to better resist or counteract the cutting force. The parts remain in the mold until they are extracted at the stacking station for that mold. In the illustration of FIG. 8, mold 'A' is at a stacking station beside the press platen 76.

FIGS. 9–15 show various intermediate positions of the toggle arm system 70 and the corresponding positions of the mold-supporting table 68 to reach a molding position for mold 'A', with mold 'B' at a stacking station. For reference purposes, the molding position for one mold is the position where that mold is aligned with the vertical central axis 134 of the thermoforming press, and the stacking station is where the mold is farthest from the vertical central axis 134.

Figure 9:
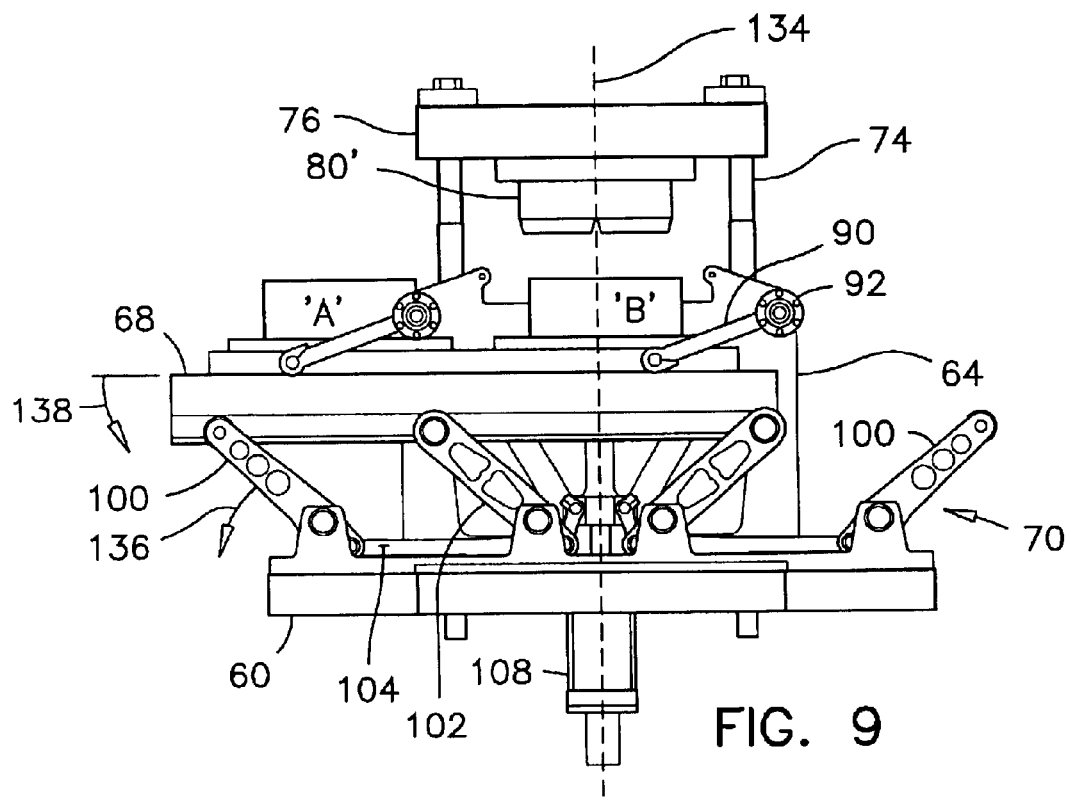
FIGS. 9–14 are partial front views of the thermoforming press with the mold-supporting table in a first, second, third, fourth, fifth and sixth positions respectively, along a path toward the second molding position.
Figure 10:
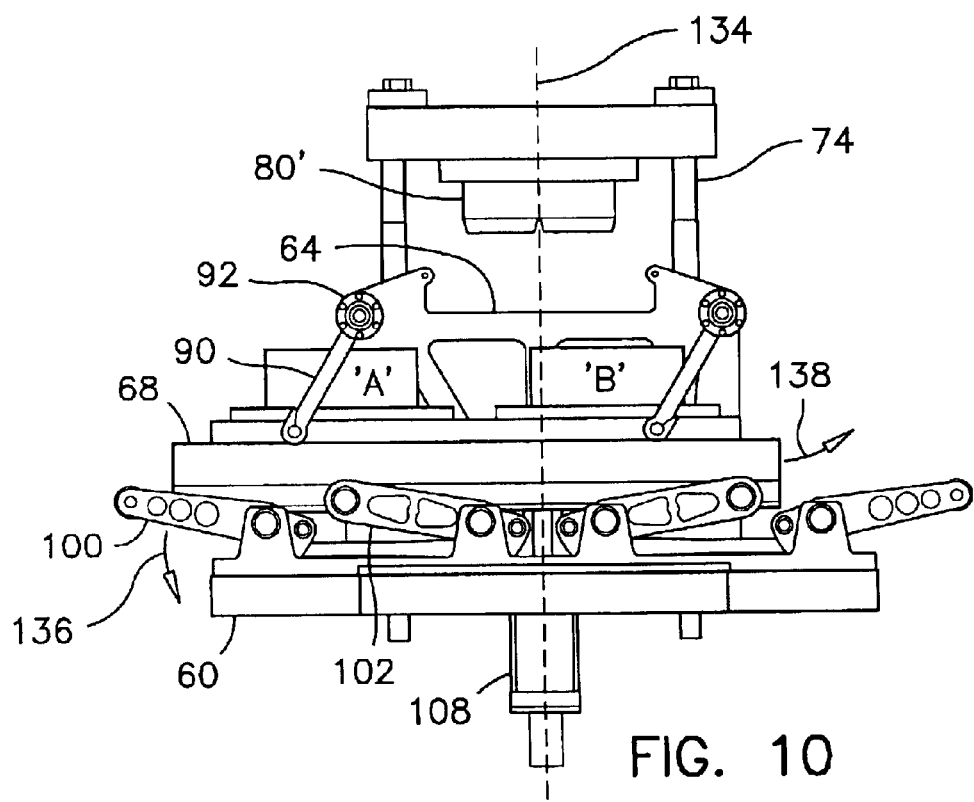
Figure 11:
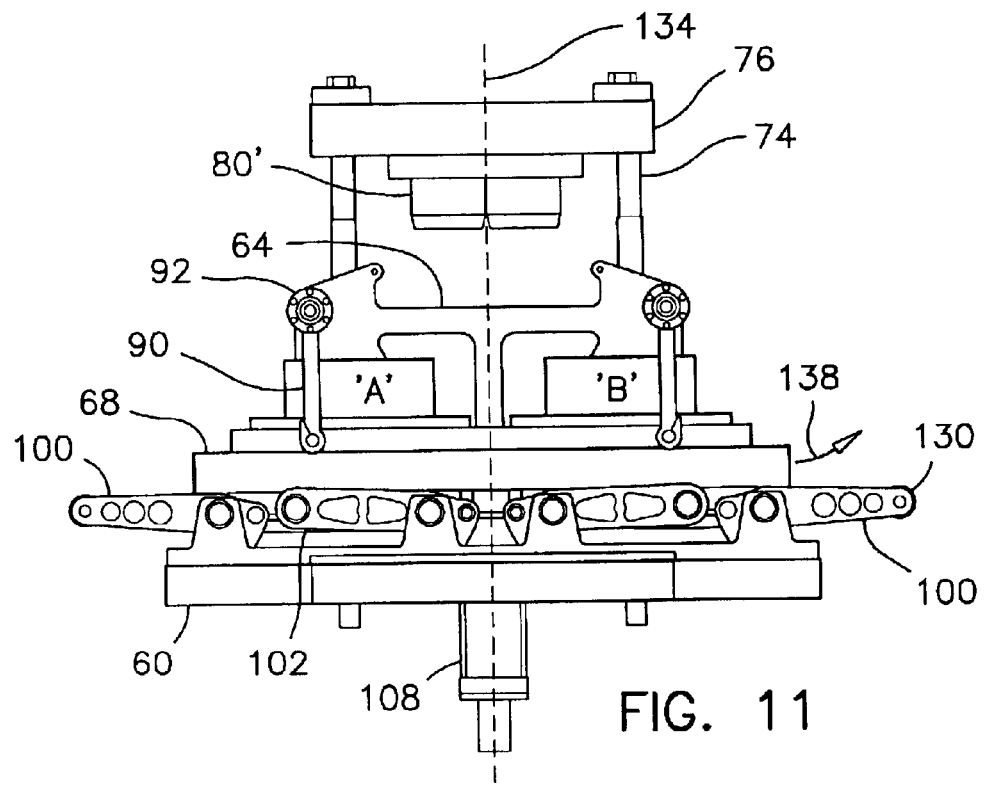

In the illustrations of FIGS. 9–11, the movement of the arm sets 100, 102 is downward as is illustrated by arrow 136. The pendulum movement of the mold-supporting table 68 is shown as label 138. It will be appreciated that during its downward movement, the mold-supporting table 68 picks up momentum. During this segment of its travel, the potential energy of the table or the gravity forces acting on it are converted into kinetic energy. In FIG. 11, the arm sets 100, 102 are at their lowest position, and the link bars 90 are straight down. The momentum of the mold-supporting table 68 carries the table pass this lowest point and up to the other side of the central vertical axis 134. The movement of the arm sets 100, 102 changes direction at that point, as indicated by the arrow 136 in FIGS. 9–10 changing to arrow 140 in FIGS. 12–14.

Figure 12:
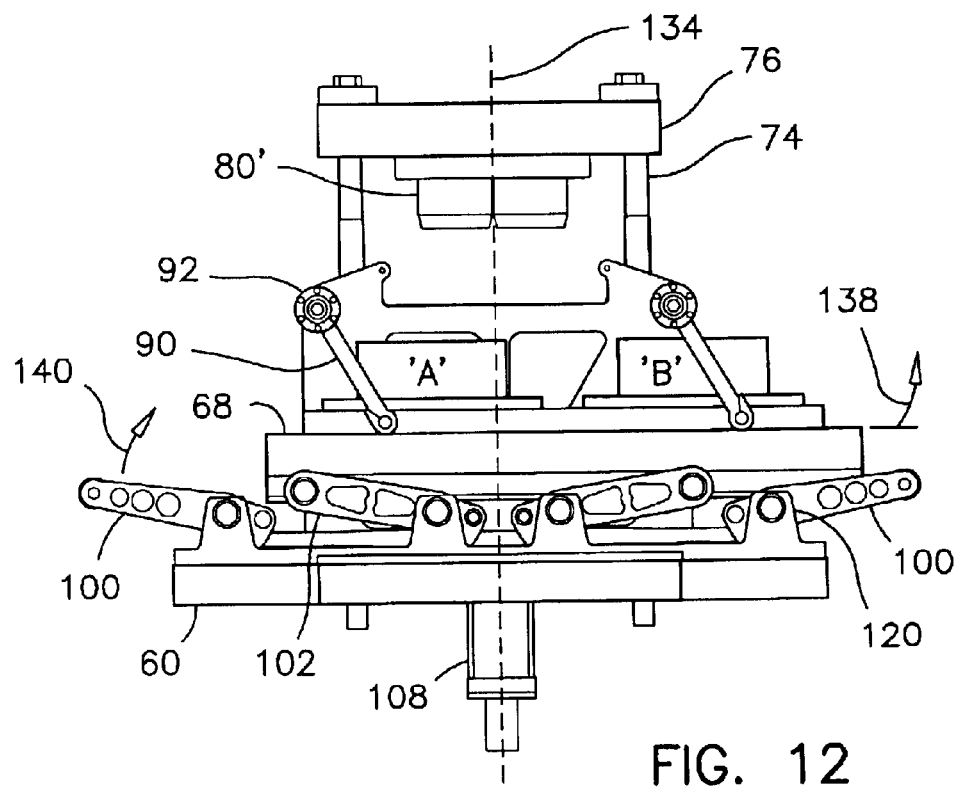
Figure 13:
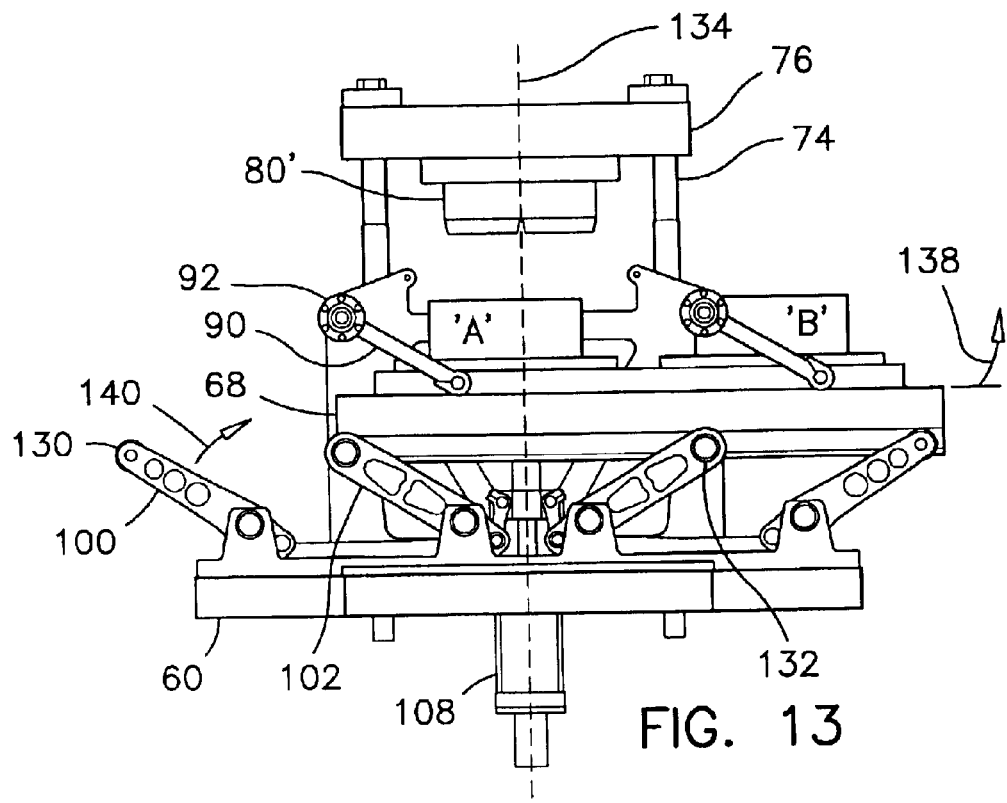
Figure 14:
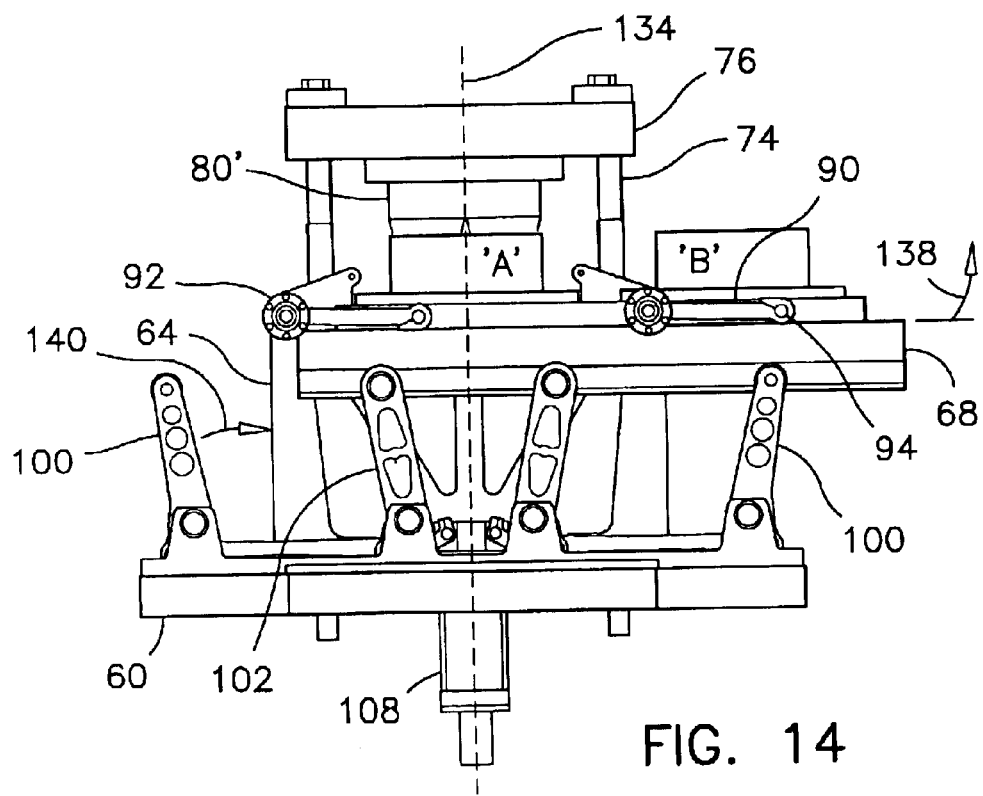

In FIGS. 12–14, the arm sets 100, 102 are actuated upward to follow the upward movement of the mold-supporting table 68 to its second molding position as shown in FIG. 14, wherein the mold 'A' is engaged with the forming die assembly 80', trapping the web (not shown) there between.

In FIG. 14, plastic parts are being formed in the mold 'A'. A further movement of the arm sets 100, 102 in the direction of arrow 140 to their vertical positions shown in FIG. 15 follows the movement of the mold 'A' contacting the cutting dies 82 to separate the molded parts from the web. The movement of the toggle arm system during the forming stroke 'E' and the cutting stroke 'F' is continuous during both steps. The separate stroke lengths in the toggle arm system 70 are provided to counteract both the forming and cutting forces with different pressures as required, such that the energy of the pendulum system is not reduced nor increased by the energy consumed during these process steps.

Figure 15:
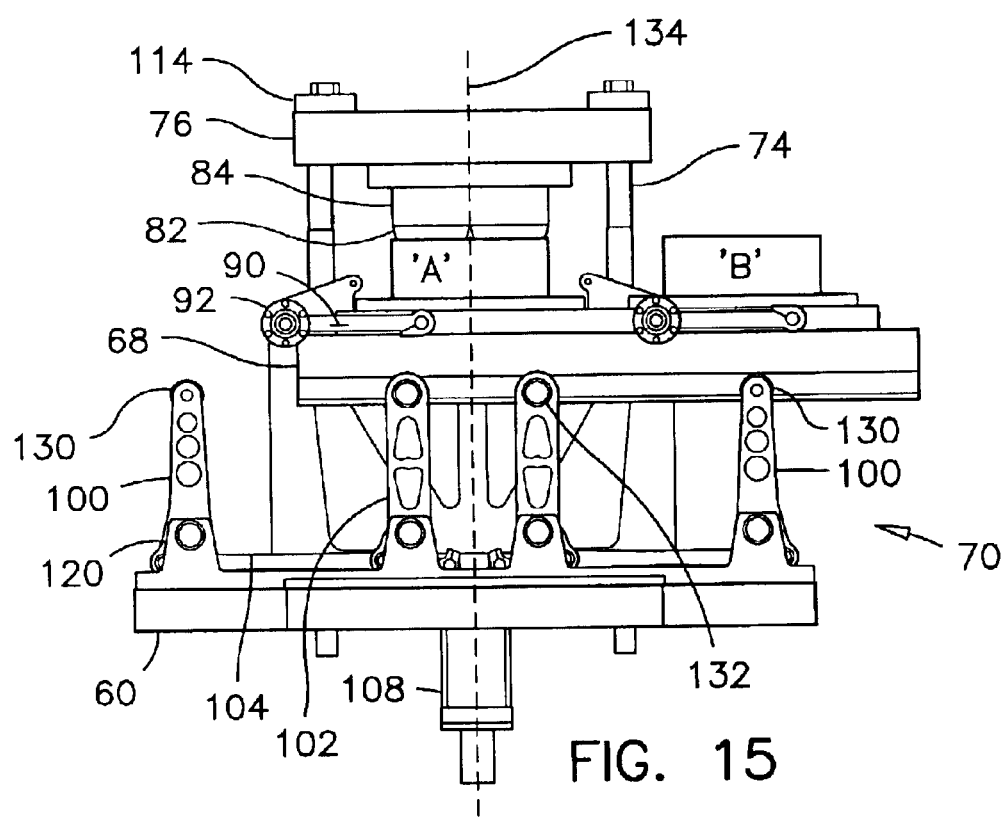
FIG. 15 is a partial front view of the thermoforming press with the mold-supporting table in the second molding position.

Also in FIG. 15, the molded parts in mold 'B' are removed at that location. The position of mold 'B' is a stacking station for that mold. The extraction and stacking of the molded parts from that molds will be explained later when making reference to FIGS. 26–30.

Theoretically, the momentum of the mold-support table 68 in motion is sufficient to carry the table 68 from one molding position to the other. In practice, however, bearing friction and other mechanical defects must be compensated for. Therefore, the toggle arm system 70 is also used to apply a subtle upward push to the mold-supporting table to make it reach each molding position. The toggle arm system is also used to apply a subtle downward pull on the table to accelerate its movement and increase the cycle speed of the thermoforming press beyond that of the natural frequency of the pendulum system.

Figure 16:
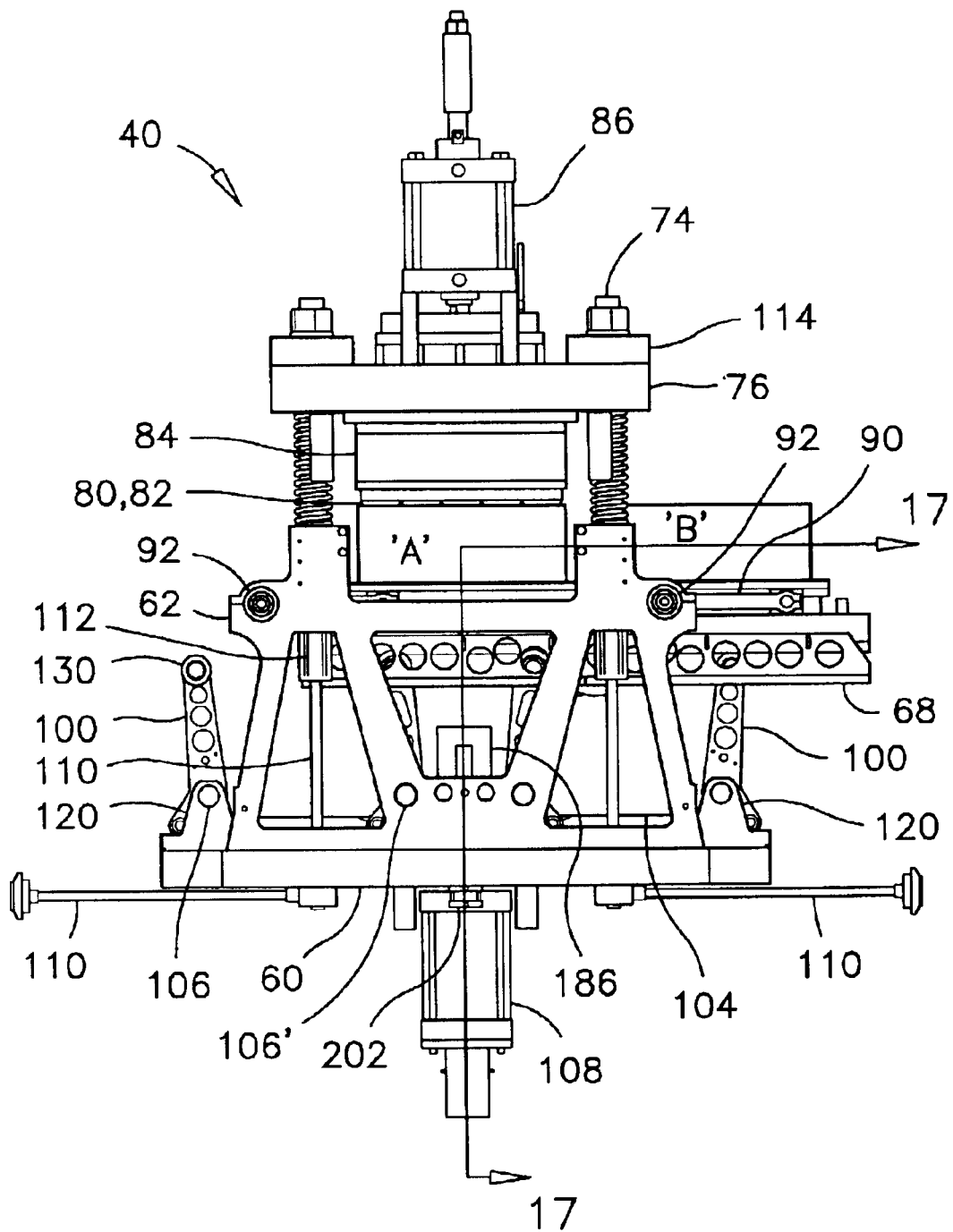
FIG. 16 is another partial front elevation view of the dual-mold thermoforming press according to the preferred embodiment of the present invention showing structural details not shown in the previous FIGS. 9–15.

FIG. 16 illustrates the same position as just described and illustrated in FIG. 14, but with the front frame member 62 in place. The cutting dies 82 are partly visible in this illustration.

Figure 17:
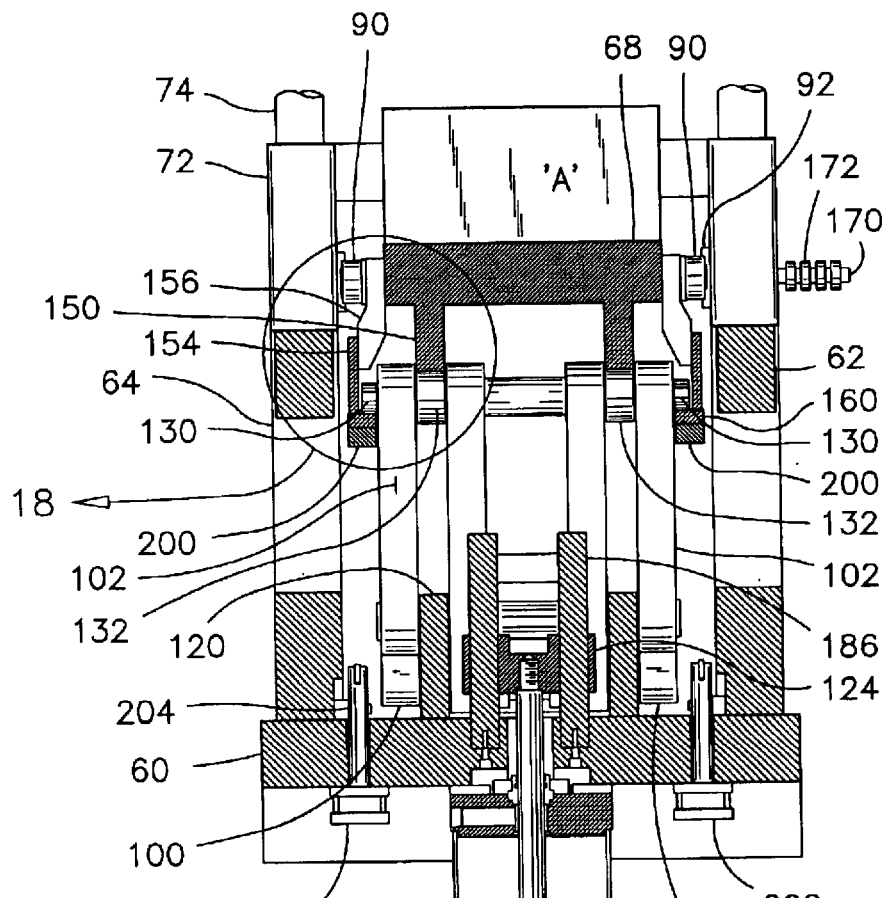
FIG. 17 is a cross-section view of the thermoforming press as seen substantially along line 17—17 in FIG. 16.
Figure 18:
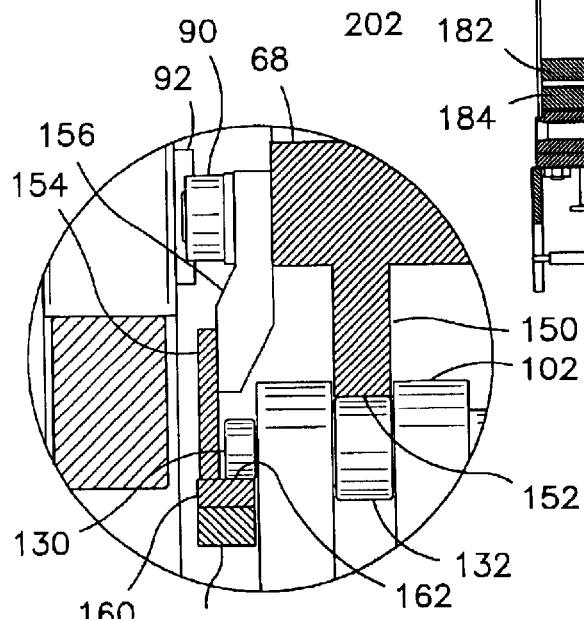
FIG. 18 is an enlarged view of the rails under the mold-supporting table as seen in the detail circle 18 in FIG. 17.

Referring now to FIGS. 17 and 18, the engagement of the rollers 130 and 132 with the mold-supporting table 68 is illustrated therein. The mold-supporting table 68 has a pair of inside rails 150 extending longitudinally thereunder. Each inside rail 150 has a downward facing surface 152 against which the inside rollers 132 are in contact and operate. The mold-supporting table 68 also has side plates 154 affixed to its sides by several brackets 156. Another rail 160, referred to as the outside rail, is mounted along the lower edge of each side plate 154 and is spaced vertically apart from the inside rails 150. Each outside rail 160 has an upward facing surface 162 against which the outside rollers 130 are in rolling contact. This outside rail 160 defines a lip against which the outside rollers 130 are guided and held captive. It will be appreciated that the inside arm sets 102 and inside rollers 132 are used to apply upward forces to the mold-supporting table 68, and the outside arm sets 100 and outside rollers 130 are used to apply downward forces to the table to increase the downward speed of the table beyond that generated by gravity alone. For convenience, the inside rollers 132 are also referred to herein as the support rollers 132, and the outside rollers 130 are also referred to as the captive rollers 130.

The dimension tolerance between the engagement of the support rollers 132 with the inside rails 150 and the engagement of the captive rollers 130 with the outside rails 160 is selected to minimize any looseness between the toggle arm system 70 and the mold-supporting table 68.

This combination of the inside and outside rails and rollers ensures a positive contact of the mold-supporting table 68 with the toggle arm system 70 at all times and a good control of the movement of the table by the toggle arm system. Because of the gravity forces acting on the mold-supporting table, this arrangement requires little force from the second actuator 108 to achieve great speed.

When the toggle arm sets 100,102 are in their lowest position, the force available therefrom is minimum because of the large moment applicable in this position. However, the travelling speed of the table at that location is maximum and no force is required to maintain the movement of the table. When the toggle arm sets are at their highest positions, the vertical force available therefrom is maximum. This large force is available to counteract the downward forces of the molding and cutting phases of the thermoforming process. Because the movement of the arm sets is angular from an horizontal position to a vertical position, the vertical speed of the toggle arm ends, or rollers 130 and 132 is maximum when the arm sets depart from their horizontal positions and is minimum when the arm sets approach their vertical positions. The angular movement of the toggle arm system 70 provides maximum counteracting force and minimum speed during the forming and cutting phases of the thermoforming process.

The pendulum movement of the mold-supporting table 68 provides a natural means for accelerating the table when departing from a molding position, and for decelerating the table at the next molding position. The potential energy of the table in a first molding position is converted almost entirely, less the friction losses, into kinetic energy when moving toward a second molding position. The momentum of the table is converted into potential energy again when approaching the second molding position. As it can be appreciated, this pendulum arrangement offers considerable energy conservation advantages.

It has been found that the natural frequency of this pendulum arrangement is about 85 cycles per minute, giving a cycle speed of 0.7 second. It has also been found that it is possible to operate this press at cycle speeds faster than at its natural frequency.

Referring again to FIG. 17, the upper right portion of this illustration show a switch actuator shaft 170 extending from one of the link bars 90 through one of the bearing assemblies 92. This shaft 170 carries a series of juxtaposed cams 172. Because the shaft 170 extends from the link bar 90, its angular position relative to the frame member 62 is representative of the position of the mold-supporting table 68 at all times. The cams 172 are usable to actuate several limit switches (not shown) to initiate and to control every step of the forming, cutting, part retrieving and stacking processes.

Figure 19:
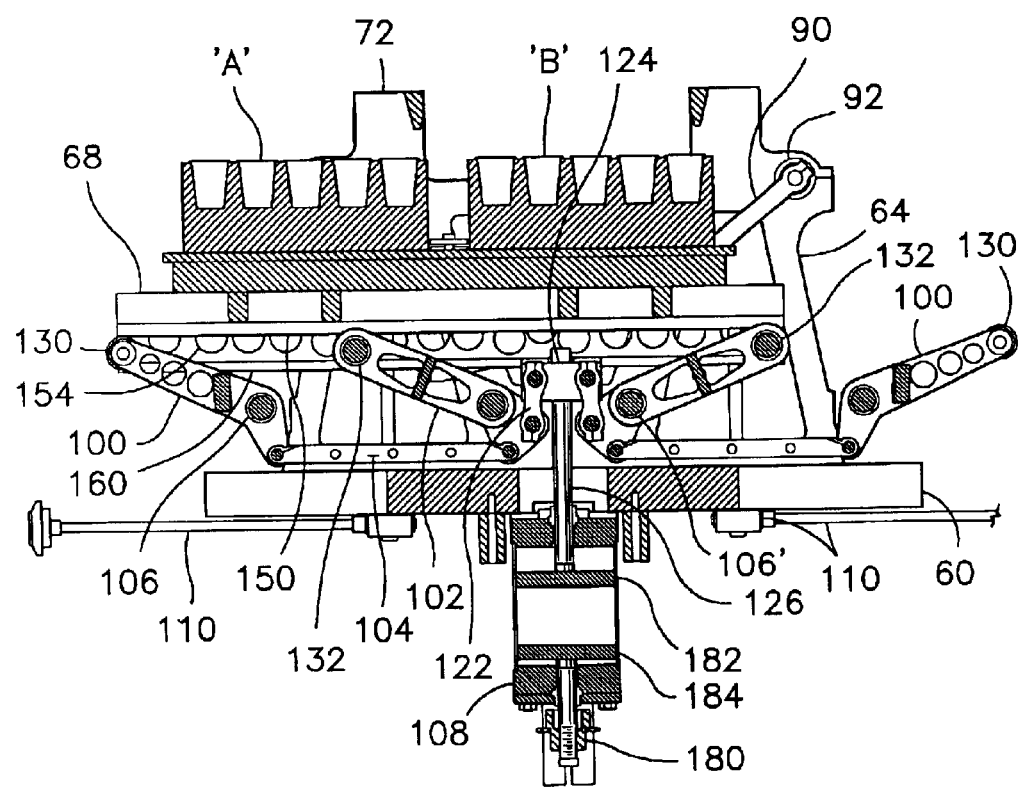
FIG. 19 is a cross-section view of the thermoforming press as seen substantially along a central longitudinal axis thereof.

As mentioned before, the second actuator 108 is a two-stage air cylinder in which the stroke lengths are adjustable by means of a setworks 180, as shown in FIGS. 17 and 19. It will be appreciated that the setworks 180 is used to control the bottoming of the first piston 182 against the second piston 184 as well as to control the stroke length of the second piston 184. Therefore, a single setting of the setworks 180 controls the displacement of the arm sets 100, 102 over the angles 'E' and 'F' as illustrated in FIG. 7. Different air pressures can be applied to each or both ports of the second actuator 108 to provide different counteracting forces during the strokes 'E' and 'F'.

As can be seen in the illustration of FIG. 17 the cylinder head block 124 is guided in its vertical movement by guide bars 186 extending from the base 60. These guide bars are also partly illustrated in FIG. 16. The cylinder head block 124 is connected to the inside arm sets 102 by link members 122 which also can be seen in FIG. 19.

Figure 20:
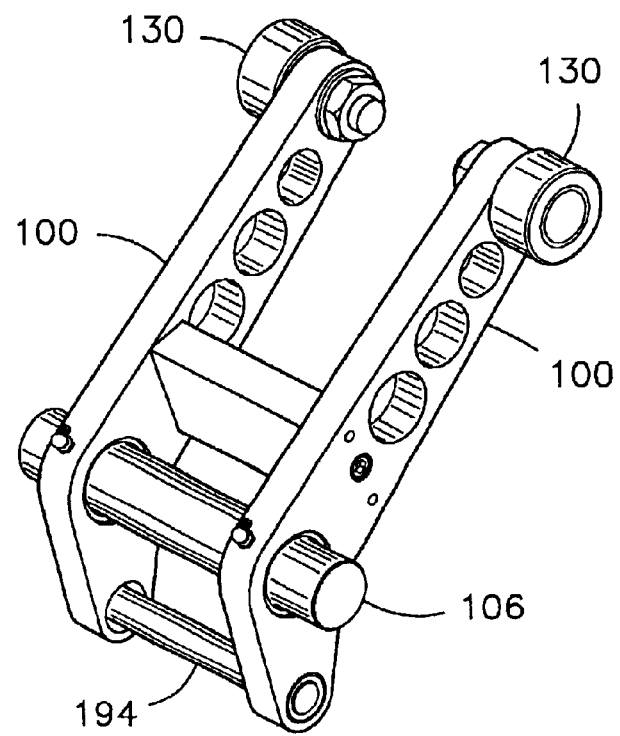
FIG. 20 is an isometric view of an outside arm set comprised in the toggle arm system.
Figure 21:
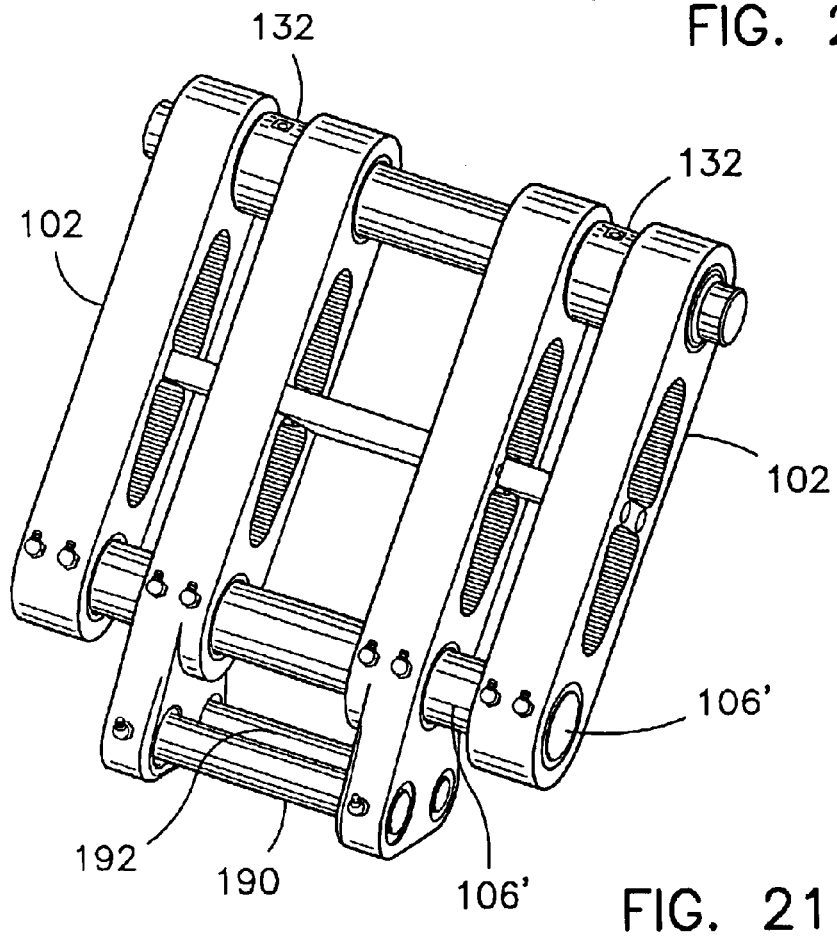
FIG. 21 is an isometric view of an inside arm set comprised in the toggle arm system.

Referring again to FIG. 16 and to FIGS. 19–21, each of the outside arm sets 100 is pivoted on a shaft, or axis 106, as mentioned before. Similarly, each of the inside arms sets 102 is pivoted on a similar shaft 106'. Both shafts 106,106' are articulated in bearing blocks 120. The link members 122 are pivoted to the shaft 190 on the inside arm sets 102. Each of the connecting rods 104 is pivoted to the shaft 192 on one of the inside arm sets 102 and to the shaft 194 on one of the outside arm sets 100.

Although the functions of the toggle arm system 70 has been described herein as providing reaction forces to the forming and severing actions, it will be appreciated that the toggle arm system 70 has the ability to generate these actions whenever the momentum of the mold-supporting table is insufficient to complete the pendulum cycle. In the preferred process, as described above, the toggle arm system is used to maintain the momentum of the mold-supporting table by providing subtle push and pull forces during the lower segment of the pendulum cycle. However, it will be appreciated that the toggle arm system may also be used to provide positive clamping forces at both ends of the pendulum cycle. This option remains the choice of the user.

Figure 22:
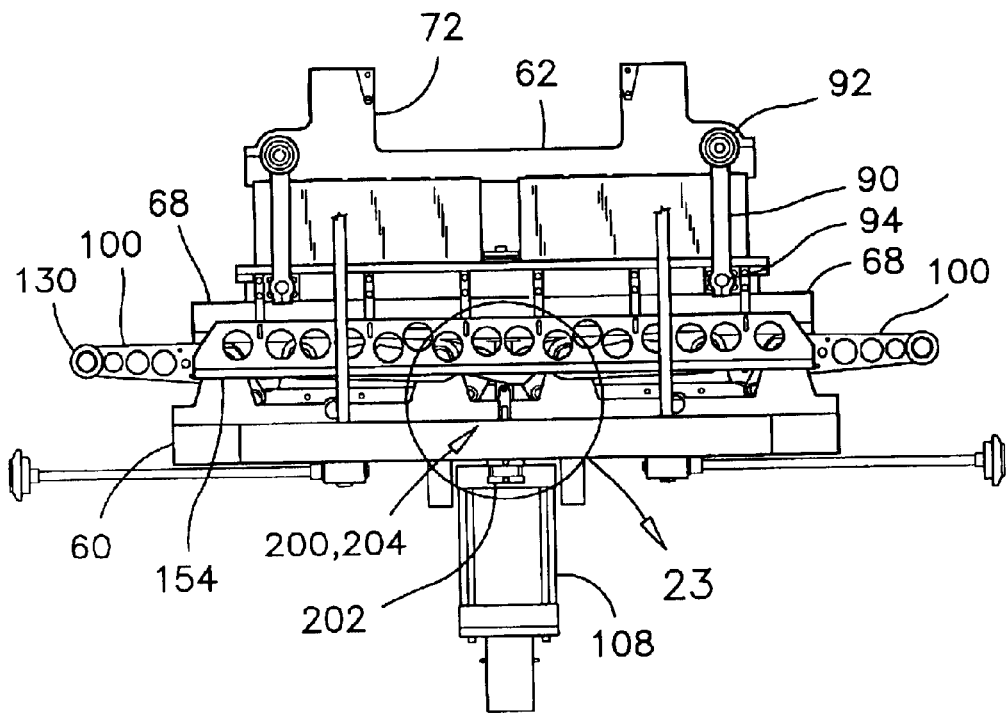
FIG. 22 is another partial side view of the dual-mold thermoforming press, showing the location of the swing-initiating cylinders.
Figure 23:
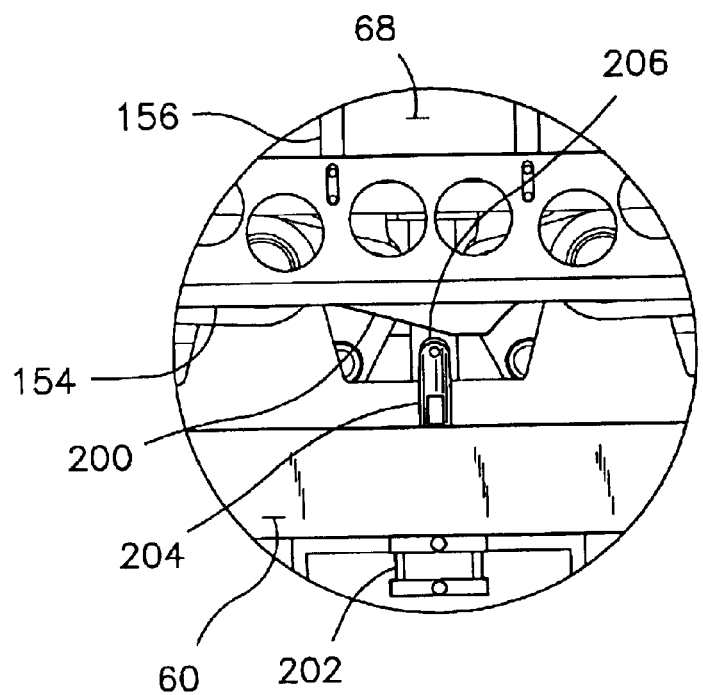
FIG. 23 is an enlarged view of the swing-initiating cylinders as seen in the detail circle 23 in FIG. 22.

Referring now to FIGS. 22 and 23, another feature of the dual-mold thermoforming press according to the preferred embodiment will be described. An incline block 200 is affixed to the underside of the outside rail 160 of the mold-supporting table 68. A swing-initiating cylinder 202 is mounted to the base 60 of the press and has an extensible plunger 204 and a roller 206 on the tip of that plunger. The plunger 204 and roller 206 are aligned with the inclined block 200. As can be seen on FIG. 17, an inclined block 200 and a swing-initiating cylinder 202 are provided on each side of the mold-supporting table 68. The swing-initiating cylinders 202 are actuated to initiate a movement in the mold-supporting table 68 from a complete stop. The swing-initiating cylinders 202 are actuated to push the rollers 206 against the inclined blocks 200 to urge the mold-supporting table 68 sideway at the same time as the toggle arm system 70 is actuated, in order to initiate a full motion in the mold-supporting table 68. These swing-initiating cylinders 202 are advantageous for reducing the required moment on the toggle arm sets 100, 102 to initiate a pendulum movement in the mold-supporting table 68, and therefore are advantageous for reducing the stress on all associated linkages, bearings and shafts comprised in the toggle arm system 70.

It will be appreciated that the inclined blocks 200 on both sides of the table 68 may be oriented in a same direction to work in unison, or may be oriented in opposite directions to offer the option of initiating a pendulum movement toward either sides of the thermoforming press.

Figure 24:
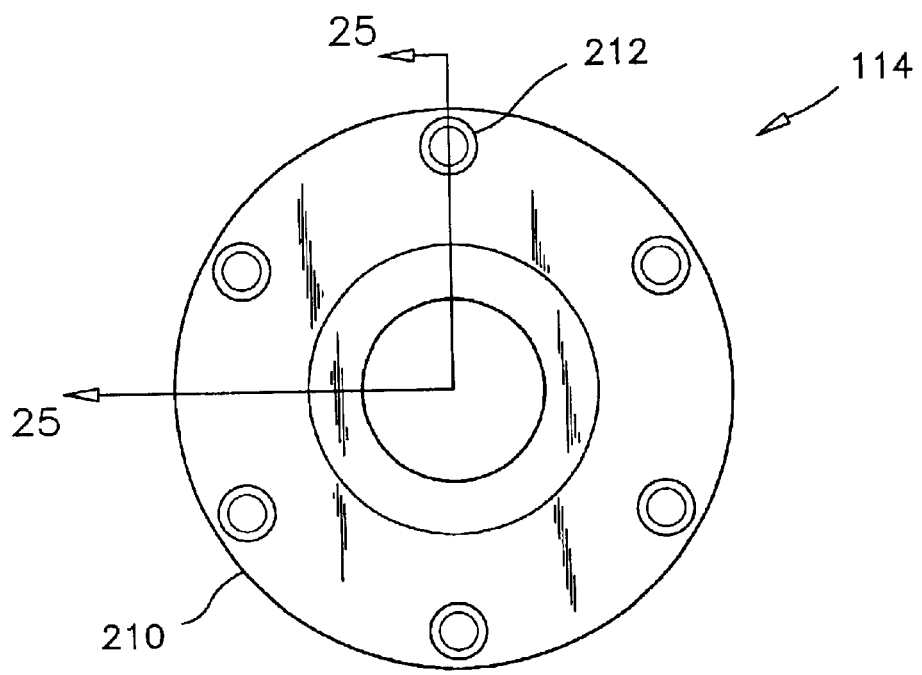
FIG. 24 is a plan view of one of the spring block mounted on each of the upper ends of the press rods.
Figure 25:
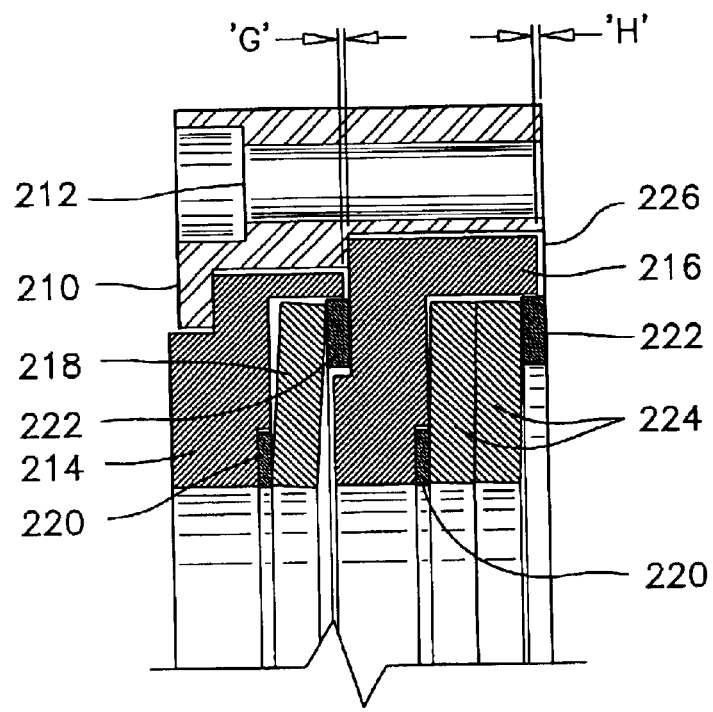
FIG. 25 is a cross-section view of the spring block as seen along line 25—25 in FIG. 24.

Referring now to FIGS. 24 and 25, another feature of the dual-mold thermoforming press will be explained. As it was previously mentioned, the pressing forces against the pressure box 84 and cutting dies 82 is partly absorbed by spring blocks 114 mounted between the press platen 76 and the upper end of the press rods 74. Each spring block 114 has an outer casing 210 which is affixed to the press platen 76 by bolts (not shown) extending though bolt holes 212. The casing 210 encloses superimposed first and second spring holders labelled as 214 and 216 respectively. The first spring holder 214 encloses a first disc spring 218, commonly referred to as a Belleville™ washer. A first pair of rings 220, 222 are mounted against the high regions of the first disc spring 218. The second spring holder 216 encloses a pair of second disc springs 224 stacked over each other and enclosed between a second pair of rings 220, 222. The first disc spring 218 in the first spring holder 214 is a low-force disc spring. The second disc springs 224 in the second spring holder 216 are high-force disc springs, relative to the first disc spring 218. The casing 210 and each of the spring holders 214, 216 have dimensions to allow a relative movement there between when the disc springs 218, 224 are relaxed. For this purpose, a clamp gap 'G' is present between the first spring holder 214 and the second spring holder 216, and a cut gap 'H' is present between the second spring holder 216 and the lower surface 226 of the casing 210.

During the operation of the press, the lower surface 226 of the casing 210 rests against the top surface of the press platen 76. The upper surface of the first spring holder 214 bears against the nut and washer set 232 on the upper end of the press rod 74, as illustrated in FIG. 5. When the mold 'A' or 'B' is brought against the cutting dies 82 during the forming stroke 'E', as seen in FIG. 14 for example, the first disc spring 218 deflects with a first resistance causing the platen 76 and the first actuator 86 to rise a distance of the clamp gap 'G', for controlling the pressure applied by the cutting dies 82 against the parts being formed inside the mold. As that mold moves upward further against the cutting dies 82, during the cutting stroke 'F' as seen in FIGS. 8 and 15, the second disc springs 224 deflect with a second resistance causing the press platen 76 and the first actuator 86 to rise further an additional distance of the cut gap 'H', for controlling the pressure being applied by the cutting dies 82 against the molded parts and the mold. The thicknesses of the gaps 'G', 'H' are determined according to the thickness and the density of the plastic material used in the parts being manufactured, and according to a nominal tolerances allowed in the pressure and adjustment of the first and second actuators 86, 108. The spring rates of the disc springs 218, 224 are selected to provide optimum force intensities during the molding and cutting phases. These disc springs are advantageous for providing consistent pressure gradients during the forming and cutting phases, despite possible slight force variations in the first and second actuators 86 and 108 and slight adjustment variations in the stroke lengths of the second actuator 108.

It will be appreciated that the disc springs 218, 224 also contribute to the improvement of the energy conservation feature of the thermoforming press according to the preferred embodiment. The disc springs capture some of the kinetic energy of the mold-supporting table during the ascending segment of its movement, and transfer this energy into the mold-supporting table at the end of the molding phase, to drive the table back into its descending segment.

Referring now to FIGS. 26–30, there are illustrated therein the various phases of a part retrieving and stacking process. The part retrieving and stacking mechanism is composed of a series of actuators 240 each having a vacuum cup (not shown) on its end, as it is customary with plastic part retrievers. The actuators are affixed to an actuator frame 242 comprising a sleeve 244. The sleeve is movably mounted over a tubular shaft 246 affixed to the press platen 76. The sleeve is movable along the tubular shaft 246 by means of a linear actuator 248 mounted inside the tubular shaft 246. This linear actuator 248 is partly illustrated in FIGS. 29 and 30. The tubular shaft 246 has a spiral slot 250 therein extending about a quarter of a turn around its circumference. The sleeve 244 is guided along the hollow shaft 246 by a pin 252 extending radially there through and into the slot 250. It will be appreciated that a movement of the sleeve 244 along the tubular shaft 246 causes the actuator frame 242 and the actuators 240 to rotate about a quarter of a turn about the tubular shaft 246.

Figure 26:
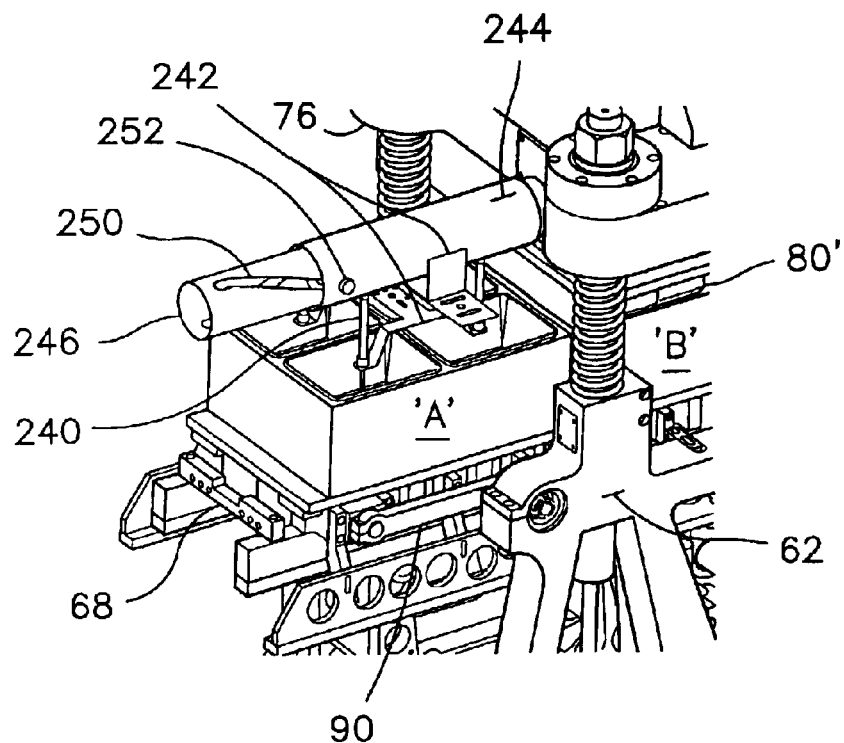
FIGS. 26–30 illustrate one of the part retrieving and stacking mechanisms in a first, second, third, fourth and fifth positions during the retrieving and stacking of the parts formed in one of the molds.
Figure 27:
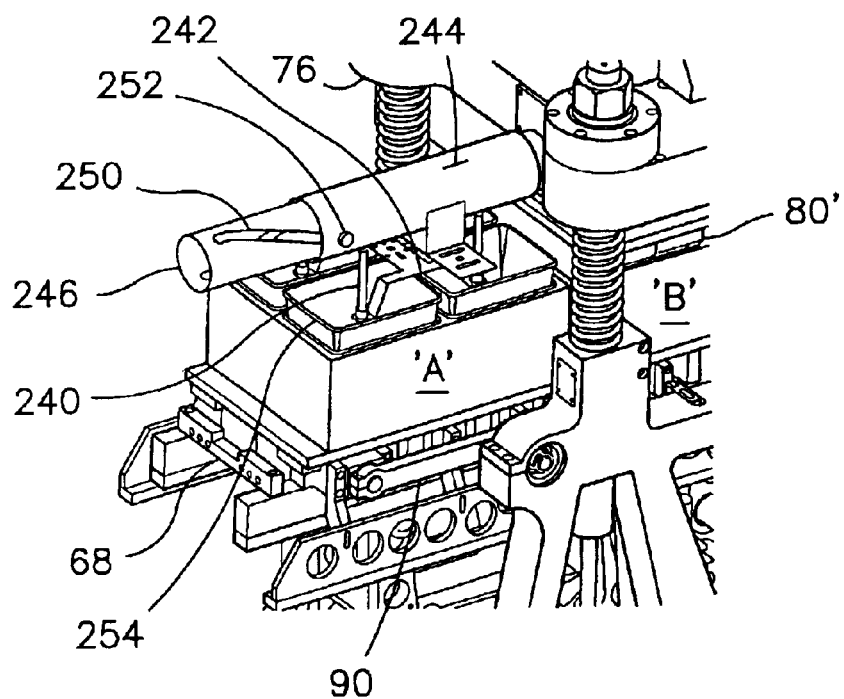

In FIG. 26, the mold 'B' is in a molding position under the forming die assembly 80', while mold 'A' is at a stacking station next to the press platen 76. When mold 'A' is in that position, the actuators 240 extend down into the molded parts 254 and a vacuum is applied to the vacuum cups to retain the molded parts 254 to the actuators 240. Then the mold 'A' starts is descending movement as shown in FIG. 27.

Figure 28:
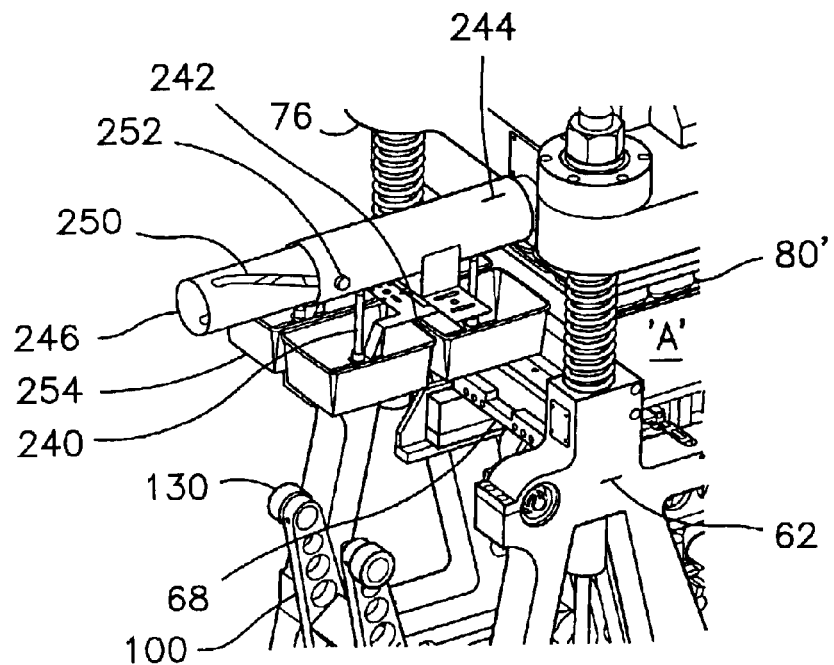
Figure 29:
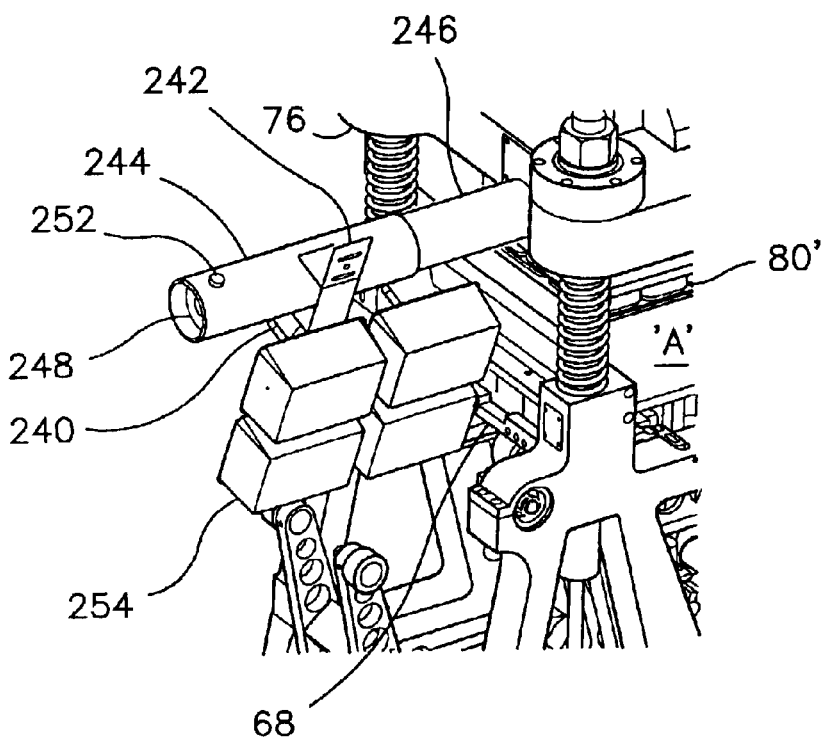
Figure 30:
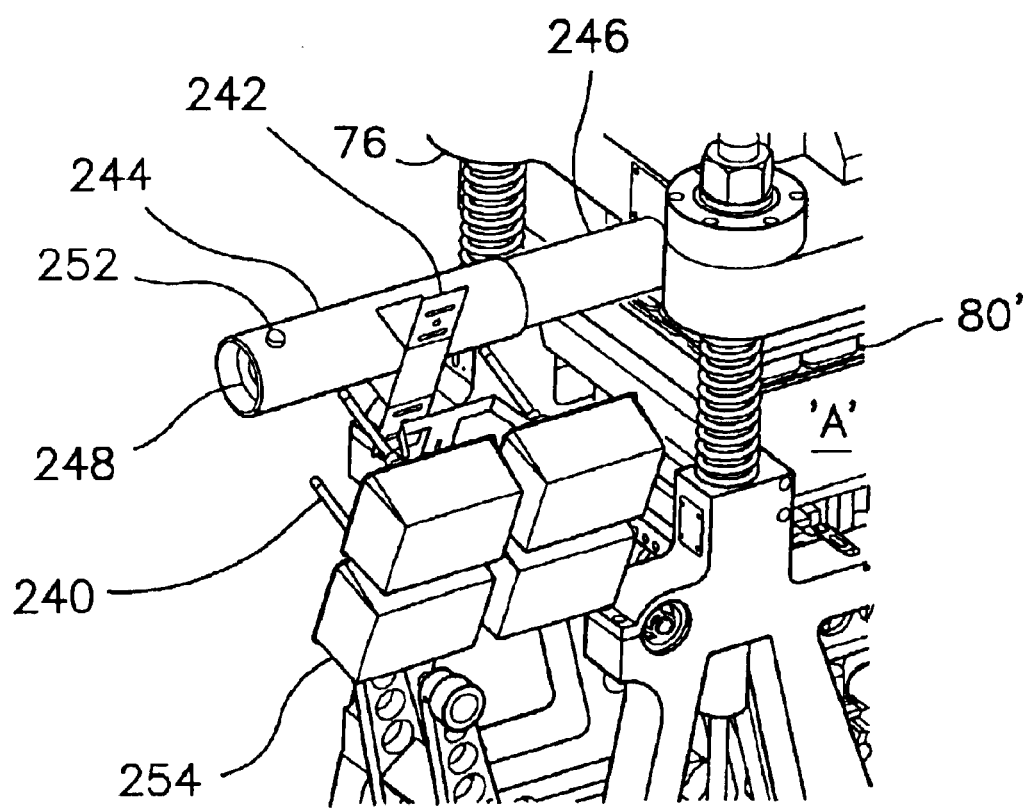

When the mold 'A' is in a molding position under the forming die assembly 80' as shown in FIGS. 28 and 29, the sleeve 244 is displaced along the tubular shaft 246, thereby rotating the actuator frame 242 and the molded parts 254 toward a stacking chute (not shown). The actuators 240 are then extended as illustrated in FIG. 30 to insert the molded parts in a stack of molded parts (not shown). The vacuum is removed from the vacuum cups to release the molded parts into the stack of molded parts. A simular part retrieving and stacking mechanism is mounted on the other side of the press platen 76 to retrieve and stack the molded parts from the mold 'B'.

This part retrieving and stacking mechanism is simpler than other conventional systems because a vertical movement of the molded parts is not required. The natural movement of the mold-supporting table 68 causes a vertical displacement of the molds which is higher than the height of the molded parts, and is all that it takes to retrieve the molded parts from the molds.

As to other manner of usage and operation of the present invention, the same should be apparent from the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

We claim:

1. A thermoforming press for manufacturing molded parts, comprising a frame;
   a forming die assembly affixed to said frame;
   a pendulum system suspended to said frame under said forming die assembly, and comprising a mold-supporting table;
   a pair of molds mounted side by side on said mold-supporting table, and
   means for imparting a pendulum movement to said mold-supporting table for alternately registering one of said molds with said forming die assembly,
   said means for imparting comprising a toggle arm system mounted to said frame under said mold-supporting table, and said toggle arm system having force-transmitting means thereon in contact with said mold-supporting table.

2. The thermoforming press as claimed in claim 1, wherein said pendulum system comprises a plurality of link bars each having a first end pivoted to said frame and a second end pivoted to said mold-supporting table.

3. The thermoforming press as claimed in claim 2, wherein said means for imparting a pendulum movement has means for imparting an angular movement of said link bars of about 180°.

4. The thermoforming press as claimed in claim 1, wherein said mold-supporting table has an underside and rails along said underside, and said force-transmitting means comprises rollers in contact with said rails.

5. The thermoforming press as claimed in claim 4, wherein said rails comprise upper rails having downward-facing surfaces and lower rails having upward-facing surfaces, and said rollers comprising support rollers guided against said downward-facing surfaces and captive rollers guided against said upper-facing surfaces.

6. The thermoforming press as claimed in claim 1, wherein said means for imparting a pendulum movement further comprises spring means affixed to said forming die assembly.

7. The thermoforming press as claimed in claim 5, wherein said toggle arm system has means for moving said arms and rollers over an angle of about 90°, and means for positioning said arms and rollers at a fraction of said angle.

8. The thermoforming press as claimed in claim 6, wherein said spring, means comprises means for controlling a gradient of force applied between each of said molds and said forming die assembly during a thermoforming process.

9. The thermoforming press as claimed in claim 1 further comprising a part retriever mounted to said frame adjacent said forming die assembly, and said part retriever has means to retrieve a molded part from one of said molds during said pendulum movement of said mold-supporting table.

10. A thermoforming press for manufacturing molded parts, comprising
    a frame;
    a forming die assembly affixed to said frame;
    a mold movably affixed to said frame under said forming die assembly;
    means for moving said mold relative to said forming die assembly and for engaging said mold with said forming die assembly, said means for engaging including means for consecutively moving said mold relative to said forming die assembly over a sheet-clamping gap and a sheet-cutting gap, and
    spring means mounted between said forming die assembly and said frame for allowing relative movement between said forming die assembly and said frame when said mold is engaging with said forming die assembly;
    said spring means comprising superimposed first and second compression springs of different spring rates, and means for limiting a compression of said first spring to a first displacement corresponding to said sheet-clamping gap and means for limiting a compression of said second spring to a second displacement corresponding to said sheet-cutting gap.

11. The thermoforming press as claimed in claim 10, wherein said first and second springs are disc springs.

12. A thermoforming press for manufacturing molded parts, comprising a frame having a central vertical axis;
    a forming die assembly affixed to said frame along said central vertical axis;
    a mold-supporting table suspended to said frame below said forming die assembly;
    a pair of molds mounted side by side on said mold-supporting table, said molds being mounted along a same plane perpendicular to said central vertical axis; and
    means for swinging said mold-supporting table along an arcuate pendulum movement extending symmetrically across said central vertical axis; and for alternately aligning and registering one of said molds and then the other of said molds with said forming die assembly.

13. The thermoforming press as claimed in claim 12, wherein said means for swinging comprises a plurality of link bars each having a first end pivoted to said frame and a second end pivoted to said mold-supporting table.

14. The thermoforming press as claimed in claim 13, wherein said means for swinging comprises means for imparting an angular movement of said link bars of about 180°.

15. The thermoforming press as claimed in claim 13, wherein said means for swinging further comprises toggle arm system mounted to said frame under said mold-supporting table, and said toggle arm system has force-transmitting means thereon in contact with said mold-supporting table.

16. The thermoforming press as claimed in claim 15, wherein said mold-supporting table has an underside and rails along said underside, and said force-transmitting means comprises rollers in contact with said rails.

17. The thermoforming press as claimed in claim 16, wherein said rails comprise upper rails having downward-facing surfaces and lower rails having upward-facing surfaces, and said rollers comprising support rollers guided against said downward-facing surfaces and captive rollers guided against said upper-facing surfaces.

18. The thermoforming press as claimed in claim 12, wherein said means for swinging further comprises spring means affixed to said forming die assembly.

19. The thermoforming press as claimed in claim 18, wherein said spring means comprises means for controlling a gradient of force applied between each of said molds and said forming die assembly during a thermoforming process.

20. The thermoforming press as claimed in claim 12, further comprising a part retriever mounted to said frame adjacent said forming die assembly, and said part retriever has means to retrieve a molded part from one of said molds during said arcuate pendulum movement of said mold-supporting table.

* * * * *